US009663588B2

United States Patent
Vehniäinen et al.

(10) Patent No.: US 9,663,588 B2
(45) Date of Patent: May 30, 2017

(54) METHOD FOR CONCENTRATING FIBRIL CELLULOSE AND FIBRIL CELLULOSE PRODUCT

(71) Applicant: UPM-KYMMENE CORPORATION, Helsinki (FI)

(72) Inventors: Annikki Vehniäinen, Helsinki (FI); Markus Nuopponen, Helsinki (FI); Pentti Pirkonen, Jyvaskyla (FI); Martina Lille, Vantaa (FI); Hannu Mursunen, Kangashakki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 96 days.

(21) Appl. No.: 14/367,555

(22) PCT Filed: Feb. 13, 2013

(86) PCT No.: PCT/FI2013/000008
§ 371 (c)(1),
(2) Date: Jun. 20, 2014

(87) PCT Pub. No.: WO2013/121083
PCT Pub. Date: Aug. 22, 2013

(65) Prior Publication Data
US 2014/0329094 A1 Nov. 6, 2014

(30) Foreign Application Priority Data

Feb. 13, 2012 (FI) ..................................... 20125159

(51) Int. Cl.
*D21H 11/18* (2006.01)
*D21C 9/18* (2006.01)
(Continued)

(52) U.S. Cl.
CPC ............... *C08B 15/02* (2013.01); *D21C 9/18* (2013.01); *D21H 11/18* (2013.01); *D21H 15/02* (2013.01); *Y10T 428/2982* (2015.01)

(58) Field of Classification Search
CPC ... D21C 9/02; D21C 9/04; D21C 9/06; D21C 9/18; C08B 15/02; D21H 11/18
See application file for complete search history.

(56) References Cited

U.S. PATENT DOCUMENTS

| 4,483,743 A | 11/1984 | Turbak et al. |
| 5,964,983 A | 10/1999 | Dinand et al. |

(Continued)

FOREIGN PATENT DOCUMENTS

| CH | WO 2010115785 A1 * | 10/2010 | .............. B82Y 30/00 |
| CH | WO 2011134938 A1 * | 11/2011 | .............. D21C 9/007 |

(Continued)

OTHER PUBLICATIONS

Park et al., Cellulose crystallinity index:measurement techniques and their impact on interpreting cellulase performance, 2010, Biotechnology for Biofuels, 3:10, p. 1-10.*

(Continued)

*Primary Examiner* — Anthony Calandra
(74) *Attorney, Agent, or Firm* — Nixon Peabody LLP

(57) ABSTRACT

A method for concentrating fibril cellulose including subjecting aqueous fibril cellulose at a concentration of not higher than 5% to pressure filtration where water is removed from the fibril cellulose by applying pressure to the aqueous fibril cellulose, and continuing the pressure filtration continued to an end point where over 50% of the water initially present is removed from the fibril cellulose. The pressure filtration is performed at a temperature of 30° C. or higher.

13 Claims, 3 Drawing Sheets

(51) Int. Cl.
*C08B 15/02* (2006.01)
*D21H 15/02* (2006.01)

(56) References Cited

U.S. PATENT DOCUMENTS

| | | | |
|---|---|---|---|
| 6,069,136 | A | 5/2000 | Tahara et al. |
| 6,083,582 | A | 7/2000 | Chen et al. |
| 6,224,663 | B1 | 5/2001 | Cantiani et al. |
| 2010/0065236 | A1 | 3/2010 | Henriksson et al. |
| 2011/0213169 | A1 | 9/2011 | Ristolainen et al. |

FOREIGN PATENT DOCUMENTS

| | | |
|---|---|---|
| EP | 0 402 866 A2 | 12/1990 |
| EP | 2 386 682 A1 | 11/2011 |
| EP | 2 386 683 A1 | 11/2011 |
| EP | 2 441 885 A1 | 4/2012 |
| JP | H03152130 A | 6/1991 |
| JP | H09-316102 A | 12/1997 |
| JP | H11246602 A | 9/1999 |
| JP | 2009062332 A | 3/2009 |
| JP | 2009067910 A | 4/2009 |
| JP | 4753874 B2 | 8/2011 |
| JP | 2011236398 A | 11/2011 |
| JP | 2012025896 A | 2/2012 |
| WO | 2006004012 A1 | 1/2006 |
| WO | WO 2010/102802 A1 | 9/2010 |
| WO | WO 2010/143722 A1 | 12/2010 |
| WO | WO 2011/059398 A1 | 5/2011 |
| WO | WO 2011/089323 A1 | 7/2011 |
| WO | WO 2012/035205 A1 | 3/2012 |
| WO | WO 2012/156880 A1 | 11/2012 |

OTHER PUBLICATIONS

Metso, Metso in Filtration, 2006, p. 1-8.*
Cotton Incorporated, Cotton Morphology and Chemistry, downloaded online Feb. 12, 2016, p. 1-4.*
Kalliokoski, Models of Filtration Curve as a Part of Pulp Drainage Analyzers, Jun. 2011, Universitatis Oulensis, p. 1-138.*
Mar. 26, 2015 Office Action issued in Chinese Patent Application No. 201380009068.X.
Office Action issued in Finnish Application No. 20125159 dated Oct. 25, 2012.
International Search Report issued in International Patent Application No. PCT/FI2013/000008 dated Sep. 9, 2013.
Written Opinion of the International Search Authority issued in International Patent Application No. PCT/FI2013/000008 dated Sep. 9, 2013.
Written Opinion of the International Preliminary Examining Authority issued in International Patent Application No. PCT/FI2013/000008 dated Mar. 20, 2014.
International Preliminary Report on Patentability issued in International Patent Application No. PCT/FI2013/000008 dated Jun. 5, 2014.
Sep. 29, 2015 Office Action issued in Japanese Patent Application No. 2014-557097.
Isogai et al., "Development of advanced new bio-nanofibers from wood pulp-Preparation and application of TEMPO-oxidized cellulose nanofibers", 2010 Pan Pacific Conference Report, (2010). English Abstract.

* cited by examiner

METHOD FOR CONCENTRATING FIBRIL CELLULOSE AND FIBRIL CELLULOSE PRODUCT

FIELD OF THE INVENTION

The present invention relates to a method for concentrating fibril cellulose. The invention also relates to a fibril cellulose product.

BACKGROUND OF THE INVENTION

Fibril cellulose refers to isolated cellulose microfibrils or microfibril bundles derived from cellulose raw material. Fibril cellulose, which is also known as nanofibrillar cellulose (NFC) and by other related names, is based on a natural polymer that is abundant in nature. Fibril cellulose has many potential uses for example based on its capability of forming viscous gel in water (hydrogel).

Fibril cellulose production techniques are based on grinding (or homogenization) of aqueous dispersion of pulp fibers. The concentration of fibril cellulose in dispersions is typically very low, usually around 1-5%. After the grinding or homogenization process, the obtained fibril cellulose material is a dilute viscoelastic hydrogel. The material itself is usable as such in many applications, but logistic costs are too high to transport the material from the production site. In some applications, the high water content is not acceptable, i.e. the formulations do not tolerate large amounts of water.

EP 2 441 885 A1 discloses a process for producing modified cellulose fibers. A fibrillated cellulose dispersion having a concentration of 0.01% by weight of higher may be filtered to produce a cellulose sheet using vacuum or pressure filtration.

U.S. Pat. No. 5,964,983 discloses microfibrillated cellulose containing at least 80% of primary walls and loaded with carboxylic acids, and a method for preparing same. The process comprises the following steps:

(a) hydrolyzing the pulp with acid or base at a temperature between about 60° C. and 100° C. partially to extract pectins and hemicelluloses to form a suspension;

(b) recovering a solid residue from the suspension from step (a);

(c) carrying out, under alkaline conditions, a second extraction of the residue of cellulosic material from step (b), when step (a) is an acidic hydrolysis and recovering the cellulosic material residue by separating the suspension;

(d) washing the residue from step (b) or step (c);

(e) diluting the cellulosic material from step (d) in water to obtain between 2% and 10% dry matter;

(f) homogenizing the cell suspension from step (e) wherein at least one alkaline extraction step is carried out on the cellulosic material, said alkaline extraction being carried out with a base at a concentration less than about 9% by weight, and the homogenizing step (f) is carried out by a high mechanical shear operation to provide a cell suspension, passing the cell suspension through a small diameter orifice, subjecting the suspension to a pressure drop of at least 20 MPa and to a high velocity shearing action followed by a high velocity decelerating impact.

Strong water retention is typical for fibril cellulose since water is bound to the fibrils through numerous hydrogen bonds. For example reaching a dry substance (DS) content of higher than 10 wt-% by mechanical means is not economically possible in industrial scale. Conventional methods such as vacuum filtration or centrifugation are not suitable for fibril cellulose hydrogels. Thermal drying or any other methods are too expensive for liquid removal at this DS range.

The fundamental problem in mechanical water removal is the ability of fibril cellulose hydrogel to form a very dense and impermeable nanoscale membrane around itself, for example during filtration. The formed shell prevents diffusion of water from the gel structure, which leads to very slow concentration rates. The same applies to vacuum evaporation where the skin formation blocks the evaporation of water.

Another problem in drying of fibril cellulose is the non-redispersibility of the dried material. During the water removal, the fibril-water bonds are replaced with fibril-fibril interactions and the fibrils are permanently aggregated. This can be prevented with the use of certain additives during the drying stage, such as CMC, or by chemical modification of the microfibril surface, e.g. oxidation or carboxymethylation. With those methods fibril cellulose can be re-activated after complete drying.

Thus, there is an evident need for increasing the concentration of the final product so that the transport costs would be decreased and the fibril cellulose could be used in the final destination at a suitable concentration desired by the end user by simply redispersing the fibril cellulose in water. Further, there is a need for increasing the concentration of the fibril cellulose initially to remove the most of the water so that the further handling of the fibril cellulose is facilitated, regardless of the type of the process where the fibril cellulose is to be used.

SUMMARY OF THE INVENTION

It is a purpose of the invention to provide a novel method for increasing the concentration of fibril cellulose after its manufacture. It is a further purpose of the invention to enable the concentration of fibril cellulose to the dry matter range at which transportation to upgrading site or direct utilisation place becomes feasible when the concentrated NFC is redispersed at the upgrading site or direct utilisation place.

In the method, fibril cellulose dispersed in liquid medium at a concentration of not higher than 5% is subjected to pressure filtration where liquid is removed from the fibril cellulose by applying pressure to the fibril cellulose, and the pressure filtration is continued to an end point where over 50% of the liquid initially present is removed from the fibril cellulose.

The above mentioned process is suitable for example when the initial concentration of the fibril cellulose that has issued from the manufacturing process is at a relatively low initial concentration in the range of 0.5-5.0%. The method provides an efficient and energy saving way to remove most of the liquid from the fibril cellulose that is dispersed in said liquid. Increasing the concentration from the initial one to 10% or higher means removing over 50% of liquid even for the upper value of this range of initial concentrations. It has been found that this type of product from where the liquid has been partially removed, for example by partial dewatering, is readily redispersable.

For example increasing the concentration of the fibril cellulose in liquid medium obtained from a manufacturing process to at least double of the original value by a pressure filtration process means decreasing the weight of the fibril cellulose to 50% or lower and removing over 50% of the liquid. Pressure filtration process is an efficient process for decreasing the high liquid content of the fibril cellulose to a level where the transportation becomes economically feasible.

According to one embodiment, fibril cellulose in liquid medium at a concentration of not higher than 5% is subjected to pressure filtration where liquid is removed from the fibril cellulose by applying pressure to the fibril cellulose, and the pressure filtration is continued to an end point where the fibril cellulose has reached the concentration of at least 20%. The pressure filtration can be continued to an end point where the fibril cellulose has reached the concentration of at least 30%.

According to still one embodiment, fibril cellulose in liquid medium at a concentration of not higher than 3% is subjected to pressure filtration where liquid is removed from the fibril cellulose by applying pressure to the fibril cellulose, and the pressure filtration is continued to an end point where the fibril cellulose has reached the concentration of at least 10%. The pressure filtration can be continued to an end point where the fibril cellulose has reached the concentration of at least 20% or even 30%.

The starting concentration where the fibril cellulose exists in liquid medium after the manufacture is generally 1-4%. Starting from this initial concentration, the liquid can be removed from the fibril cellulose by pressure filtration to an end point where over 50% of the water is removed. For example reaching already the end point concentrations of 2, 3, 4, 5, 6, 7 and 8% will mean removing over 50% liquid and reducing the weight of the fibril cellulose to 50% or lower, when the initial concentration is 1, 1.5, 2, 2.5, 3, 3.5 and 4%, respectively. However, starting from these relatively low initial concentrations in the range of 1-4%, the pressure filtration process can be continued and liquid can be removed until the concentration of the fibril cellulose is at least 10%. The process can be continued till the concentration of at least 20% or even till the concentration of at least 30%. The process can be continued to a suitable range, for example so that the end concentration is 15 to 25%.

The maximum concentration of the fibril cellulose subject to pressure filtration is 6%. By continuing the process to a concentration of at least 15%, for example to the range of 15-25%, means removing over 60% liquid.

The liquid medium in all above mentioned cases is usually water, that is, the fibril cellulose is aqueous fibril cellulose where cellulose fibrils are dispersed in water at a relatively low concentration, not higher than 6%. Likewise the fibril cellulose issues as aqueous fibril cellulose from a manufacturing process where the fibrous starting material suspended in water is disintegrated.

According to one embodiment, the pressure filtration process is performed at a temperature of 30° C. or higher, in which case higher final concentrations are attainable compared with the fibril cellulose that is at ambient temperature. At a temperature of at least 30° C., fibril cellulose concentrations of at least 10% are attainable. A suitable temperature range is 30-70° C. At higher temperatures, the decreased viscosity of liquids, especially water, contributes to the removal of liquid from a fibril network.

According to one embodiment, during the pressure filtration the liquid is removed from the fibril cellulose in two opposite directions.

The method is well suitable for fibril cellulose where the cellulose is chemically native, that is, unmodified, and the method is especially suitable for fibril cellulose that is obtained directly from a manufacturing process of fibril cellulose by disintegrating (homogenizing, grinding, refining etc.) a fibrous starting material where the cellulose exists in native form.

BRIEF DESCRIPTION OF THE DRAWINGS

The invention will be explained in the following with reference to the appended drawings, where.

DETAILED DESCRIPTION OF THE INVENTION

Figure 1:
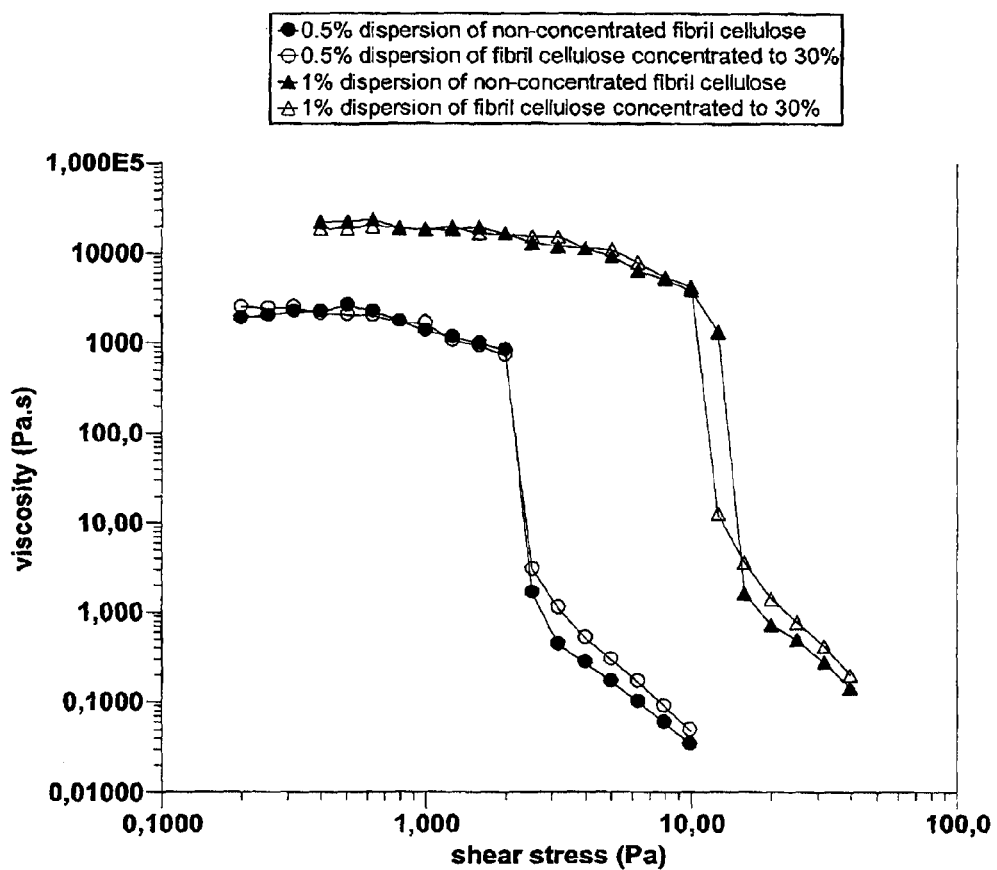
FIG. 1 presents flow curves of 0.5% and 1% fibril cellulose dispersions prepared from material concentrated to 30% dry matter by pressure filtration and from non-concentrated material.

In this specification, percentage values, unless specifically indicated other-wise, are based on weight (wt/wt). If some numerical ranges are given, the ranges include also the upper and lower values given.

The processed material, fibril cellulose, consists of cellulose fibrils whose diameter is in the submicron range. It forms a self-assembled hydrogel network even at low concentrations. These gels of fibril cellulose are highly shear thinning and thixotrophic in nature.

The fibril cellulose is prepared normally from cellulose raw material of plant origin. The raw material can be based on any plant material that contains cellulose. The raw material can also be derived from certain bacterial fermentation processes. Plant material may be wood. Wood can be from softwood tree such as spruce, pine, fir, larch, douglas-fir or hemlock, or from hardwood tree such as birch, aspen, poplar, alder, eucalyptus or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed. The cellulose raw material could be also derived from cellulose-producing micro-organisms. The micro-organisms can be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter* pasteurianus.

The term "fibril cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 µm. The smallest microfibrils are similar to so called elementary fibrils, which are typically 2-12 nm in diameter. The dimensions of the fibrils or fibril bundles are dependent on raw material and disintegration method. The fibril cellulose may also contain some hemicelluloses; the amount is dependent on the plant source. Mechanical disintegration of fibril cellulose from cellulose raw material, cellulose pulp, or refined pulp is carried out with suitable equipment such as a refiner, grinder, homogenizer, colloider, friction grinder, ultrasound sonicator, fluidizer such as microfluidizer, macrofluidizer or fluidizer-type homogenizer.

The fibril cellulose is preferably made of plant material. One alternative is to obtain the fibrils from non-parenchymal plant material where the fibrils are obtained from secondary cell walls. One abundant source of cellulose fibrils is wood fibres. The nanofibrillated cellulose is manufactured by homo-genizing wood-derived fibrous raw material, which may be chemical pulp. The disintegration in some of the above-mentioned equipment produces fibrils which have the diameter of only some nanometers, which is 50 nm at the most and gives a dispersion of fibrils in water. The fibrils can be reduced to size where the diameter of most of the fibrils is in the range of 2-20 nm only. The fibrils originating in secondary cell walls are essentially crystalline with degree of crystallinity of at least 55%.

The starting material for the process is usually fibril cellulose obtained directly from the disintegration of some of the above-mentioned fibrous raw material and existing at a relatively low concentration homogeneously distributed in water due to the disintegration conditions. The starting material can be an aqueous gel at a concentration of 0.5-5%. The gel of this type contains too much water to be handled conveniently in a later process or transport chain.

Liquid removal from fibril cellulose is done using pressure filtration. The pressure filtration proceeds till the end point where the fibril cellulose forms a cake with a final desired DS (dry substance). The final DS of the filter cake can be 10-30% (concentration of the fibril cellulose, the remainder being liquid and possible other ingredients). Filtration can be performed so that the filtrate is clear without any particles penetrated through the filter cloth. Filtration temperature is higher than 30° C. Pressure during the filtration can be 5-100 bars (1 bar=100 kPa). Pressure filtration device can be a fixed volume chamber filter press or membrane filter press. In a fixed volume chamber filter press the pressure is caused by the increased pumping pressure as the solids build up in the chamber during filtering of the liquid through the filter cloth. In a membrane filter press the pressure builds up initially as above, and in the final stage of the filtration the cake formed in the chamber is compressed or squeezed by a membrane or diaphragm on one side or on both sides to remove further liquid from the cake. The filtration chamber is limited by filter cloth on one side or both sides, which determine the flat sides of the cake to be formed from the solids (cellulose fibrils). The cake is formed during the filtration either by effect of pumping pressure of the fibril cellulose or the combined effect of pumping pressure and subsequent compression/squeezing by a membrane/diaphragm or a pair of membranes/diaphragms. The cake formed is a flat piece where the flat opposite sides are formed according to the opposite sides of the chamber and where liquid removal has taken place through one or through both sides of the cake due to the filter cloth on one or both sides of the chamber, respectively. The dimension of the cake perpendicularly to the flat sides (thickness) is considerably smaller than any dimension along the flat sides which are a wide surfaces.

Two sided liquid removal is recommended for the efficiency of the process, because more filtering area (area of filter cloth) is available per volume of the fibril cellulose.

Compared with the evaporation, the skin formation is not so pronounced in pressure filtration, because liquid is continuously urged by pressure through the layer of solids formed against the filter cloth and through the outer surface of the cake being formed.

The fibril cellulose filter cake can be used as such in various applications or it can be comminuted or granulated prior to use. The cake can be for example shredded so that the fibril cellulose is easier to transport and handle further, or comminuted in other ways, for example granulated. Redispersion of the concentrated fibril cellulose is possible without compromising its ability to form highly viscous dispersions in water.

The cakes can issue from the pressure filtration process in various thicknesses, depending on the equipment used where the dimensions of the chambers determine the final dimensions of the cake. The minimum thickness of the cake is usually 15 mm, but thinner cakes can also be made, depending on the application if the cake is to be used as such.

The pressure filtration process in all of the embodiments mentioned can be performed by retaining a volume of fibril cellulose in a confined space limited at least partially by a water-permeable filtering structure (for example a filter cloth), applying pressure to said volume of fibril cellulose, and allowing water to be filtered out from said volume of fibril cellulose through said filtering structure. It is to be understood that said volume of fibril cellulose may not be constant during the process but can decrease in course of the water removal as is the case in a membrane filter press, it being, however, confined in a space limited at least partly by said filtering structure even in this case. After the end point (the desired concentration) has been reached, the volume of fibril cellulose is taken out as a coherent structure, "cake", whereafter it can be processed further in some of the ways mentioned above.

Figure 3:
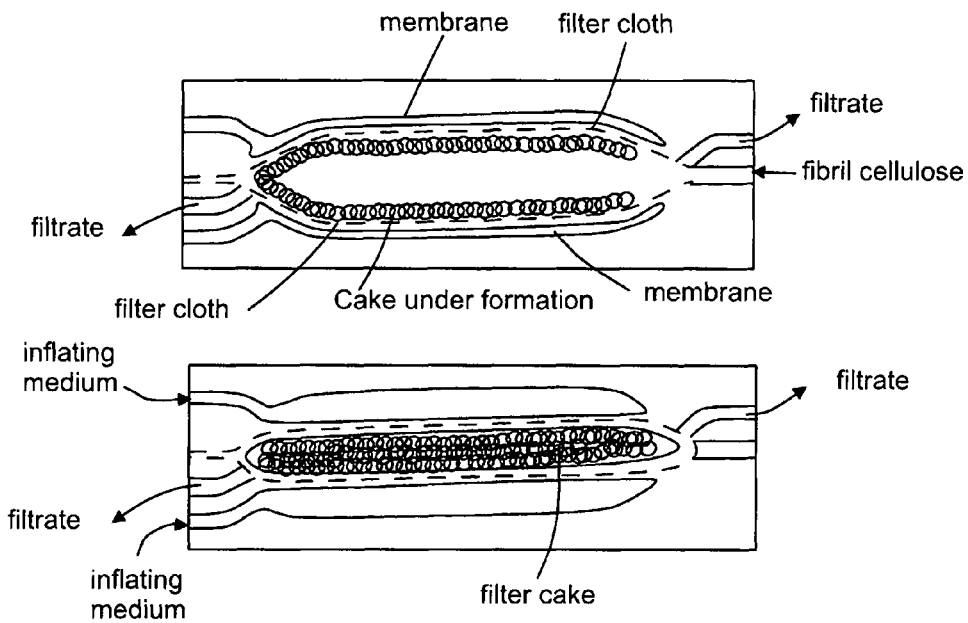
FIG. 3 is a schematic representation of a pressure filtration process.

The pressure filtration process is schematically shown in FIG. 3 giving a two-sided liquid removal and squeezing by membranes or diaphragms from both sides as example. The liquid (filtrate) filtered from the fibril cellulose is squeezed out through the filter cloth in the whole area of the cake and removed through channels at the both ends of the filter cake. It is also possible that the cake is compressed from one side only by a membrane/diaphragm, but the liquid removal is two-sided.

In the equipment, there can be several confined spaces to which the volumes of fibril cellulose can be introduced and which form filtration chambers working in parallel during the pressure filtration process. Equipment where filtration chambers are arranged vertically or horizontally are known. Such equipment usually work cyclically. The pressure filtration of fibril cellulose can be a cyclic process where the fibril cellulose in liquid medium is introduced to several chambers, liquid is filtered by pressure, and the cakes obtained in the filtration are removed from the chambers and conveyed to further processing. The method is not limited to the use of one specific type of equipment only.

In ambient temperature, DS content of only 5-7% can be obtained using industrial mechanical equipment. Two sided liquid removal is recommended, because immediately at the start of filtration, very dense film-like layer is formed on the surface of filter cloth delaying crucially liquid removal from fibril cellulose.

GENERAL EXAMPLE OF THE METHOD

DS content of 10-30% and filtrate without particles can be obtained in the elevated temperature. The process is started by pumping heated (>30° C.) fibril cellulose having DS content of 2-4% to the filtration chambers, and liquid is removed through the both ends of the chambers. Selected pressure (5-100 bars) is maintained until the desired DS content is obtained. Pumping can also be continued until the desired pressure level or DS content is achieved in the cake, and then as extra operation, the filter cake can be compressed by a membrane to squeeze more liquid out of the filter cake. As final step, air blowing through the cake can be performed. Thereafter the filter cake is removed from the chamber.

Filter cloth should carefully be selected to avoid fibril cellulose penetration through the filter cloth and sticking to the cloth surface. Filter cake can then be redispersed to form a lower concentration of fibril cellulose, for example to original viscosity, before utilisation.

As a filter cloth, a densely woven cloth made of synthetic polymer and having no visible holes is preferred. For example polypropylene multifilament cloths can be used.

Concentration of fibril cellulose by pressure filtration does not hamper its ability to form highly viscous dispersions in water. This is demonstrated in the following example.

Example 1

Fibril cellulose was concentrated by pressure filtration to a dry matter content of 30%. Fibril cellulose dispersions were prepared at 0.5 and 1.0% concentrations by mixing pieces of filter cake with water in a Büchi-mixer (B400, max. power 2100 W, BÜCHI Labortechnik AG, Switzerland) for three 10 s cycles. Corresponding dispersions were prepared from non-concentrated fibril cellulose having an initial dry matter content of 2%. The viscosity of the dispersions was measured as function of the applied shear stress with a AR-G2 rheometer (TA Instruments, UK) equipped with a vane geometry.

FIG. 1 presents the results of the viscosity measurements as flow curves of 0.5% and 1% fibril cellulose dispersions prepared from material concentrated to 30% dry matter by pressure filtration and from non-concentrated material. The viscosity of 0.5% and 1.0% fibril cellulose dispersions prepared from the concentrated material was comparable to the viscosity of the dispersions having the same concentrations but made of non-concentrated material in the whole studied shear stress range. High-shear mixing, such as that applied with a Büchi-mixer, is needed for successful redispersion of fibril cellulose concentrated to 30% dry matter. Redispersion can be facilitated by comminution of the filter cake or hydration of the material prior to mixing.

Fibril cellulose concentrated to lower dry matter contents (e.g. 5-15%) can be redispersed with less efficient mixing than the material concentrated to 30%, as shown in the following example.

Example 2

Fibril cellulose was concentrated by pressure filtration to various dry matter levels. Dispersions at a concentration of 0.5% were prepared from the non-concentrated fibril cellulose and from the material concentrated to 30% dry matter as described in Example 1 above. From fibril cellulose concentrated to 10 and 15% dry matter, 0.5% dispersions were made in water by mixing with a low-power blender (Mini-Mix, Nordica, power 150 W) for several short cycles within a period of 5 min. The viscosity of the dispersions was measured as described in Example 1.

Figure 2:
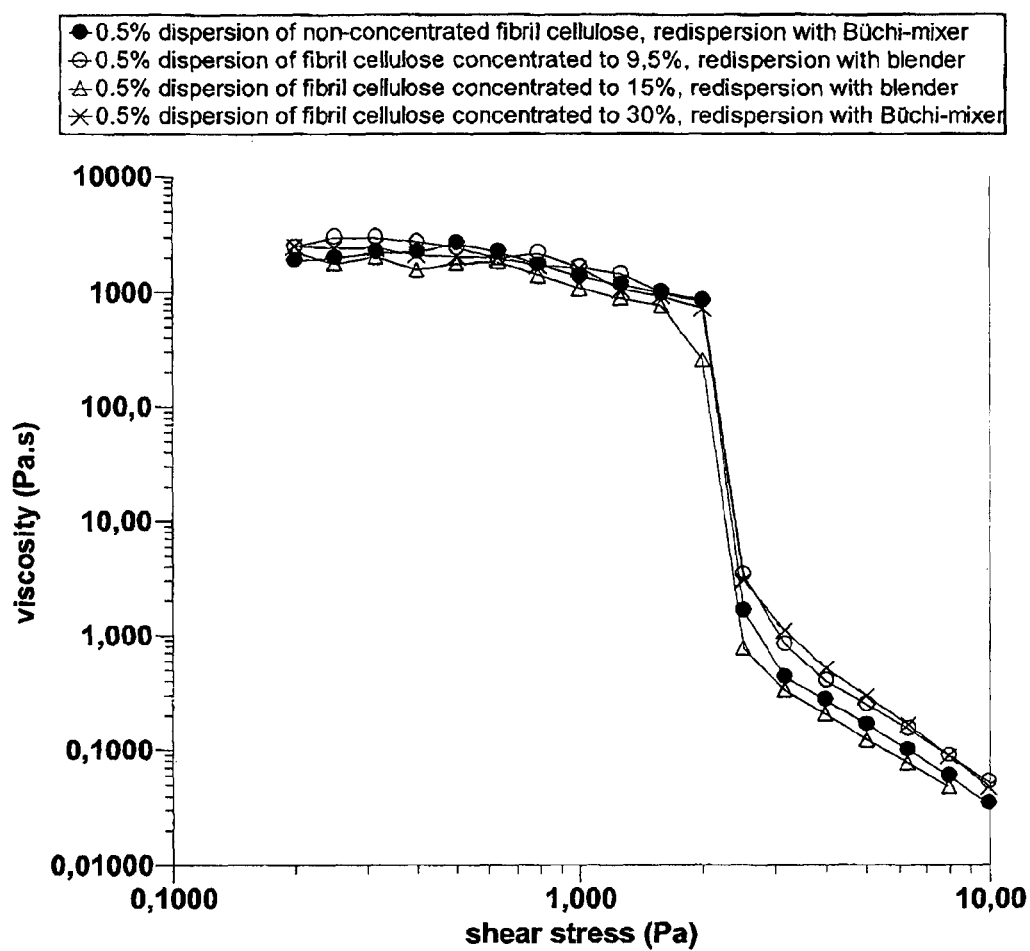
FIG. 2 presents flow curves of 0.5% fibril cellulose dispersions prepared from material concentrated to various dry matter levels in comparison with 0.5% dispersions made from the non-concentrated material.

FIG. 2 presents flow curves of 0.5% fibril cellulose dispersions prepared from material concentrated to various dry matter levels in comparison with 0.5% dispersions made from the non-concentrated material. Redispersion was performed either with a low-power blender (Mini-Mix) or with the Büchi-mixer.

The results in FIG. 2 show that fibril cellulose concentrated to 10 and 15% dry matter content can be successfully redispersed with a low-power blender, as a comparable viscosity level as that obtained with the Büchi-mixer could be reached. A longer mixing time was however needed with the low-power blender than with the Büchi-mixer.

Both in FIGS. 1 and 2 it can be seen that irrespectively of the final concentration, the same zero-shear viscosity level (plateau in the viscosity vs. shear stress graph as the shear stress approaches zero) as with non-concentrated sample can be attained. The zero-shear viscosity at 0.5% measuring concentration is above 1000 Pa·s with both non-concentrated samples and samples concentrated to 9.5-30% and redispersed to the measuring concentration. It can also be seen that in the graph area above 1000 Pa·s, the individual measurement points obtained with the concentrated samples, if not coinciding with, are slightly above or below the measuring points obtained with the non-concentrated samples, which is an indication of a good match between the viscosity graphs.

Figure 4:
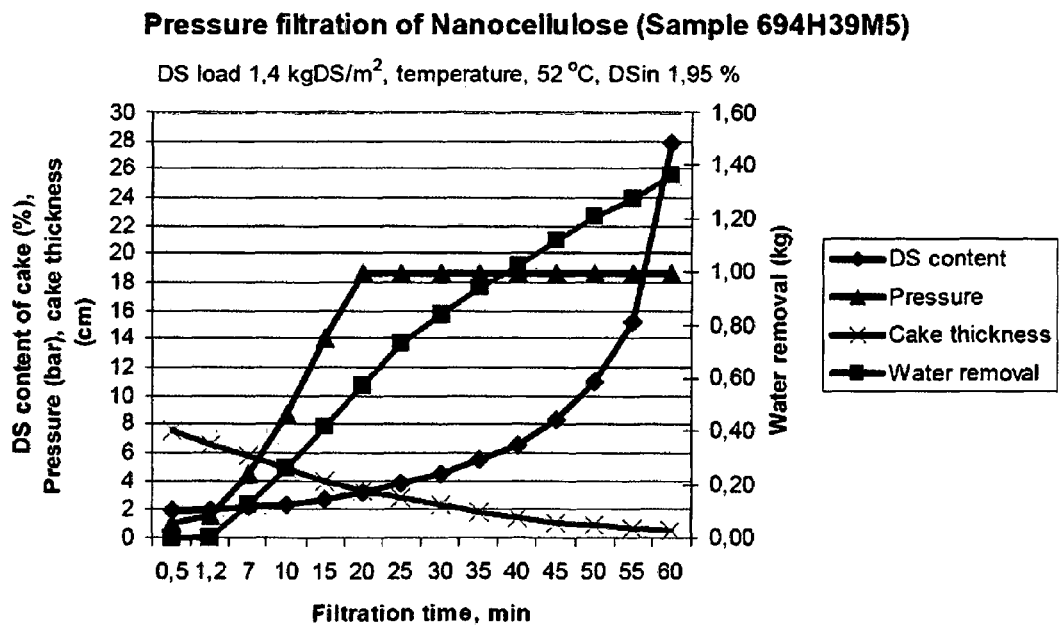
FIG. 4 presents various variables of a pressure filtration process plotted against time.

The general course of the pressure filtration process is shown in FIG. 4 with respect to the dimensions of the volume of the fibril cellulose subjected to pressure filtering (the dimensions of the cake), the pressure, DS content of the cake and water removed. The starting material was an aqueous fibril cellulose at a concentration of 1.95%, the temperature was 52° C. and the DS load per available filtering area was 1.4 kg/m$^2$. It can be seen that in the initial stage of the pressure filtration, the pressure is allowed to rise to a predetermined constant level (in this case between 18 and 19 bar), and it is kept at this constant level until the desired end point (DS content of the cake) is achieved (in this case between 27 and 28%). It can also be seen that the cake is compressed below one tenth of the original dimension (thickness) of the fibril cellulose volume. The time from the start of the pressure till the end point is about 60 min.

It is recommendable that the initial dimension of the volume of the fibril cellulose in the direction of water removal, which can be defined as direction perpendicularly to the filtering structure, is reasonably small so that the water can diffuse through the cake. In this case the dimension (thickness) is initially below 10 cm, about 7.5 cm. The filtering load can be best characterized by DS load, which is obtained by dividing the total DS of the fibril cellulose (kg) in the initial fibril cellulose volume by the available filtering area (m$^2$) for the same volume. The value is reduced to one half if two-sided water removal is used instead of one-sided water removal (that is, water is removed through a filtering structure on both sides of the volume). The DS load affects the time needed to reach a certain final concentration of the fibril cellulose (fibril cellulose DS content) in the cake when other variables are kept constant.

The pressure filtration process can also be characterized by specific energy consumption (input energy per fibril cellulose DS), unit for example MWh/ton fibril cellulose DS. This can vary depending on the DS load and desired concentration of the fibril cellulose at the end point. The heating of the fibril cellulose need not be calculated, if the fibril cellulose is obtained from a manufacturing process where it's temperature is already elevated due to the energy it has been subjected to during the mechanical disintegration, and after the manufacturing process, it is introduced at that temperature or at a temperature to which it has been allowed to cool but still above 30° C. to the pressure filtration process.

The redispersable product obtained through pressure filtration can be characterized by the following properties. A measurement method is briefly described below.

A method based on accurate high resolution microscopy and image analysis was developed for the quantitative determination of micro- and nanoscale fibers of fibril cellulose whereby the unfibrillated fiber-like material is determined in the fibril cellulose as follows. The amount of detectable fibers or fiber-like particles within a known amount of pulp sample is measured and the rest of the sample is then regarded as belonging into the non-detectable category, i.e. micro- and nanoscale particles. Commercial fiber analyzers can be used for characterizing the unfibrillated fiber-like material in fibril cellulose. For example, Kajaani Fiberlab and FS-300 devices are suitable, however, other similar fiber analyzers with similar detection resolution can be also used.

The fiber analysis comprises the steps, where the dry mass of the sample is determined for use in the analysis, followed by volumetric scaling during dilution and sampling, disintegration of the sample. A greater sample size than with conventional pulp samples may be used if necessary. The sample size for the measurements may be increased from the recommended one in order to increase the amount of detected fibers during the analysis. Further, the 'Block removal'-routine is disabled to avoid measurement stoppages. If the analyzer detects too few fibers, it assumes a block to be present, and starts block removal actions. If this occurs a few times during a measurement, the measurement will be stopped, and a part of the sample remains unanalyzed. Dry solids content (dry mass) of each sample is determined. It can be carried out using standard methods in an oven, where the sample is dried under a heat source until constant weight, or other suitable method known in the art. When interpreting the numerical values provided by the analyzer, one must remember that all the reported values represent only the particles that the device has detected, i.e. those particles having their dimensions above some micrometers (width >~5 µm, fibre lengths smaller than 0.01 mm will not be recorded). For simplicity a quantitative measure particles per milligram is used.

Carrying out fiber analysis of fibril cellulose samples:

A commercial fiber analyzer was used. Suitable devices are for example fiber analyzer Kajaani FiberLab or FS-300. The sample preparation and measurement was carried out as instructed for typical fiber coarseness-measurement, with the following exceptions:

Dry matter content (DMC) was determined by weighing a sample mass of minimum 8 g for dry matter content determination, heating until constant weight. Weighting accuracy was 0.0001 g.

Sample dilution was carried out as follows:

Amount of sample to be diluted into 5 liter water vessel:

8 grams, if the DMC is around 2%. Weighting accuracy 0.0001 g.

16 grams, if the DMC is around 1%. Weighting accuracy 0.0001 g.

Pulp mixer was applied until all visible fibril bundles had disappeared.

The product obtained through pressure filtration fulfills preferably the following rheological parameters when dispersed in water:

Zero shear viscosity 1 000-8 000 Pa·s and Yield stress 1-10 Pa measured at 0.5% concentration in water by rotational rheometer (AR-G2, TA Instruments, UK) using a vane geometry.

Further, the fibril cellulose has Brookfield viscosity (1.5% in water, 10 rpm) from 5 000 to 25 000 mPas and contains particles from 5 000 to 20 000/g as determined using fiber analysis.

According to another embodiment, the fibril cellulose has Brookfield viscosity (1.5% in water, 10 rpm) from 25 000 to 50 000 mPas and contains particles from 10 to 5 000/g determined using fiber analysis.

The measurement concentrations are not necessarily the same where the product is dispersed, but they serve to define the properties of the product.

The method can also be applied to such fibril cellulose grades that are specifically modified to improve their dewatering ability.

The invention claimed is:

1. A method for concentrating nanofibrillar cellulose, comprising:
    subjecting only nanofibrillar cellulose, which is a wood-based material, in a liquid medium at a concentration of not higher than 6% and at a temperature of 30-70° C., to pressure filtration such that liquid is removed in two opposite directions from the nanofibrillar cellulose by applying pressure of at least 5 bar to the nanofibrillar cellulose, and
    continuing the pressure filtration to an end point where over 50% of the liquid initially present is removed from the nanofibrillar cellulose, to the final dry substance of 10-30% of nanofibrillar cellulose,
    whereby the nanofibrillar cellulose in this final dry substance is redispersable in water and will give, when redispersed in water at a dispergation concentration in the range of 0.5-1.0 wt-%, a viscosity profile that is equal to the viscosity profile it had originally at the same dispergation concentration.

2. The method according to claim 1, wherein the aqueous nanofibrillar cellulose that is subjected to the pressure filtration is at the concentration of 0.5-5.0%.

3. The method according to claim 1, wherein the pressure filtration is continued to an end point where the nanofibrillar cellulose has reached the concentration of 15-30%.

4. The method according to claim 1, wherein the pressure filtration is continued to an end point where the nanofibrillar cellulose has reached the concentration of 20-30%.

5. The method according to claim 1, wherein the aqueous nanofibrillar cellulose that is subjected to the pressure filtration is at the concentration of not higher than 4%.

6. The method according to claim 5, wherein the pressure filtration is continued to an end point where the nanofibrillar cellulose has reached the concentration of 15-30%.

7. The method according to claim 5, wherein the pressure filtration is continued to an end point where the nanofibrillar cellulose has reached the concentration of at least 20-30%.

8. The method according to claim 1, wherein the aqueous nanofibrillar cellulose that is subjected to the pressure filtration is at the concentration of 1-4% and the pressure filtration is continued to the final dry substance of 15-25% of nanofibrillar cellulose.

9. The method according to claim 1, wherein the pressure filtration process is performed at a temperature which the nanofibrillar cellulose has reached as a result of a preceding manufacturing process or to which the nanofibrillar cellulose has been cooled from the temperature it has reached as a result of a preceding manufacturing process.

10. The method according to claim 1, wherein the pressure of 5-100 bar is used during the pressure filtration.

11. The method according to claim 1, where the cellulose of the nanofibrillar cellulose is chemically native.

12. The method according to claim 1, where the nanofibrillar cellulose is aqueous nanofibrillar cellulose and the liquid removed in the pressure filtration is water.

13. The method according to claim 1, where after the pressure filtration the nanofibrillar cellulose is dispersed to a liquid medium.

* * * * *